Aug. 9, 1949.　　　　　J. A. C. YULE ET AL　　　2,478,443
MANUFACTURE OF PHOTOGRAPHIC FINE CONTACT SCREENS
Filed May 18, 1946　　　　　　　　　　　　　　5 Sheets-Sheet 1

John A. C. Yule
Frederick B. Johnston
INVENTORS

BY
ATT'Y. & AG'T.

Aug. 9, 1949.     J. A. C. YULE ET AL     2,478,443
MANUFACTURE OF PHOTOGRAPHIC FINE CONTACT SCREENS
Filed May 18, 1946     5 Sheets-Sheet 2

John A. C. Yule
Frederick B. Johnston
INVENTORS

Aug. 9, 1949.   J. A. C. YULE ET AL   2,478,443
MANUFACTURE OF PHOTOGRAPHIC FINE CONTACT SCREENS
Filed May 18, 1946   5 Sheets-Sheet 3

John A. C. Yule
Frederick B. Johnston
INVENTORS

BY
ATT'Y. & AG'T

Aug. 9, 1949.    J. A. C. YULE ET AL    2,478,443
MANUFACTURE OF PHOTOGRAPHIC FINE CONTACT SCREENS
Filed May 18, 1946    5 Sheets-Sheet 4

John A. C. Yule
Frederick B. Johnston
INVENTORS

John A. C. Yule
Frederick B. Johnston
INVENTORS

UNITED STATES PATENT OFFICE 2,478,443

MANUFACTURE OF PHOTOGRAPHIC FINE CONTACT SCREENS

John A. C. Yule and Frederick B. Johnston, Rochester, N. Y., assignors to Eastman Kodak Company, Rochester, N. Y., a corporation of New Jersey Application May 18, 1946, Serial No. 670,734

18 Claims. (Cl. 95—81)

This invention relates to the manufacture of contact halftone screens, sometimes referred to as vignetted halftone screens such as are used in contact with a sensitive emulsion when making halftone records from a continuous tone original.

It is the object of this invention to provide a method of making fine contact screens and in this respect it is alternative to the invention described in our copending application Serial No. 670,735 filed concurrently herewith.

It is the primary object of the invention to provide a method and apparatus for making a fine contact screen from a relatively coarse two-tone screen such as a ruled screen. In one embodiment of the invention the total number of dots per unit area are doubled and in another preferred embodiment of the invention the total number of dots are quadrupled so that there are twice the number of lines per inch. In the quadrupling embodiment, the number of lines per inch in the contact screen are measured in the same direction as in the two-tone screen and a 100 line two-tone screen makes a 200 line contact screen. In the doubling embodiment the number of lines per inch in the contact screen are measured at 45° to the pattern of the two-tone screen and a 100 line two-tone screen makes a 141 line contact screen. The doubling of the number of dots per unit area was described by Deville in U. S. Patent 551,266. The doubling embodiment of the present invention is an improvement thereof and has for its object the provision of a method of manufacturing screens with accurate distribution of dots.

Other specific objects of the invention include the control of density distribution in the individual dot elements which in turn controls the tone reproduction curve when using the contact screen, the uniformity of the dots throughout the whole screen area and the correction of any errors existing in the two-tone screen which is used as a master screen. Similarly an object of one feature of the invention is to provide a screen spacing (i. e. distance between the screen and the sensitive film which is exposed to make the contact screen) which gives a diffraction pattern particularly suitable for the doubling or quadrupling of the number of dots.

Certain terms used throughout this specification and claims will now be defined. A contact halftone screen is now a well understood term. The present invention, while applicable to so-called line screens, is most useful with dot screens and will be described with reference thereto. In general the pattern of the dots is a rectilinear one or a simple modification thereof. Since the direction of the pattern turns through 45° in the doubling embodiment, it is useful to refer to this "direction of the pattern." The meaning of the term is obvious and can be defined as the direction (or two directions at right angles) of the lines joining the centers of the adjacent dots in the pattern. For example an upright pattern would be one in which the lines are horizontal and vertical. The master screen may be ruled or manufactured by any standard method and is referred to as a two-tone screen because the areas thereof are either light or dark. The light areas are referred to as openings and in general are square but many have other shapes. The distance between the centers of adjacent openings, herein referred to as D, is the inverse of the number of lines per unit length of the screen. For example D equals .01 inch in a screen having 100 lines per inch.

When such a two-tone screen is held in front of a photosensitive layer, the exposure of the layer is made by a diffraction pattern depending on the screen separation and on the wavelength of the exposing light. Since the diffraction pattern is caused by the interaction of the light through various screen openings, it is not possible to state that one dot is exposed through one or any particular set of openings, but it is possible to state that the exposure is received "primarily" through one opening or one particular set of openings. A dot which is aligned with a light source and one of the openings is said to be primarily exposed through that opening.

The light source or plurality of sources as it is in the present invention consists of a number of illuminated apertures in a plane at a distance in front of the two-tone screen. Individual sources equivalent to the apertures could be used and the term aperture should be understood to cover such arrangements. However, the clearest understanding of the invention will result from the use of the word aperture because of the practicability of such arrangements and the simplicity with which they can be visualized. Any one dot of the contact screen may be aligned with a group of the apertures through different screen openings. The group for any one dot is referred to as a set of apertures. The same set of apertures exposes many dots over the screen areas, but different sets of apertures expose different sets of dots. Again we are referring to the primary exposure ignoring the diffraction effects for the moment. Also it will be noted that the term dot is here used to refer to an area of the photosensitive film even before exposure, which area is ultimately to become one of the dots of the contact halftone screen. Thus the term "dot" is generic to the finished screen element and to the area which is to be exposed to be processed to form a dot.

When individual light sources are used as apertures the candle power thereof would be the factor determining the primary exposure of the dots. If the apertures were all the same size, the brightness thereof would be the controlling factor. In any case, whether individual light sources are used, whether apertures all the same size with different density features are used, or whether different size apertures are used, the controlling factor is the "radiant flux" from the various apertures. When a set of apertures primarily expose each of a set of dots, the total radiant flux from the set of apertures is important and also the location of the center of gravity, as it were, of the light coming from the set of apertures is important. This center of gravity is referred to as the "radiant flux centroid" of the set of apertures. For a single uniformly illuminated aperture, the centroid is in the center of the aperture. For two equal flux apertures, the centroid is halfway between them. For two apertures three inches apart one having twice the radiant flux of the other, the centroid is on the line joining the centers of the apertures and one inch from the more intense aperture, two inches from the less intense aperture. Obviously the computation of the location of the centroid is the same as that for computing the center of gravity of a number of spaced particles, the radiant flux being taken in place of the mass.

In discussing the spacing of the apertures, the distance between centers is always measured and it is convenient to refer to the component of this distance which is parallel to the distance D above defined. The component is referred to as V. When the aperture pattern is parallel to that of the two-tone screen, for example when adjacent apertures are vertically or horizontally spaced in front of an upright two-tone screen the distance V is the distance between the aperture centers itself, but in the doubling embodiment of the invention the apertures are arranged at 45° to the pattern of the two-tone screen in which case the value V is $$\frac{1}{\sqrt{2}}$$

times the distance between the centers of adjacent apertures. As before V is the vertical separation of adjacent apertures even though the apertures are not vertically above one another, taken with reference to an upright two-tone screen. In certain embodiments of the invention the apertures are circular in form with sections extending along the lines joining the centers of adjacent apertures; that is they extend in both directions along such lines and are referred to as "ears" on the apertures. Also one embodiment of the invention employs twelve apertures whose centers are distributed so as to be located on the twelve corners of the Geneva cross (the well known red cross) which is for the purpose of this specification defined as a Greek cross having twelve equal sides. There are eight outer corners and four inner corners to such a cross. All Greek crosses have equal arms but the length of the arm may not equal its thickness as here required in the definition of a Geneva cross. Other terms used in this specification and claims have meanings which are well understood either from the dictionary or from the context in which they are used.

With terminology thus defined, the present invention can be described as a method of manufacturing contact halftone screens with a pattern of dots, by exposing a photosensitive layer through a two-tone screen to at least three illuminated apertures in a plane at a distance in front of and parallel to the screen and to the layer and processing the layer. There must be at least two sets of apertures only one set of which can consist of only a single aperture. When doubling the number of dots, there are two sets of apertures and when quadrupling the number of dots, there are four sets of apertures since there are four independent sets of dots. The radiant flux from each set of apertures must be substantially equal to that from each other set in order to provide uniform dot density. Furthermore the radiant flux centroid for the various sets of apertures must all substantially coincide in order to insure uniform distribution of the sets of dots under practical manufacturing conditions. If the radiant flux centroids do not coincide, it is practically impossible to prevent disarrangement of one set of dots relative to another.

The separations of the photosensitive layer, the two-tone screen and the apertures are approximately according to the formula $$\frac{2V}{L}=\frac{D}{S}$$

where L is the distance of the aperture plane from the photosensitive layer, S is the distance of the two-tone screen from the layer, D, as above defined, is the distance between the centers of adjacent openings in the two-tone screen and V, also defined above, is the component measured parallel to D of the distance between the centers of adjacent apertures. In doubling the number of dots per unit area, two sets of apertures are used distributed in a pattern at 45° to the two-tone screen pattern. In quadrupling the number of dots, four sets of apertures are used distributed in a pattern parallel to the two-tone screen pattern. In a preferred embodiment of the invention a large number of apertures are used each having ears as above defined. One preferred embodiment has twelve apertures located at the corners of a Geneva cross and when this embodiment is used in the quadrupling form of the invention the Geneva cross is oriented parallel to the two-tone screen pattern and twice as much radiant flux is sent through each of the four inner corner apertures as through each of the eight outer corner apertures of the Geneva cross.

It will be noted that the aligning of the apertures properly takes care of any discrepancy in the form of the two-tone screen. For example if the rulings are not quite at right angles, the apertures to be properly aligned must be similarly arranged not quite at right angles. If the two-tone screen is made up of lines ruled on opposite sides of a transparent plate (or on two plates with a layer of cement between the rulings) the vertical separation of the apertures would be slightly different from the horizontal separation to take care of the difference in the separation from the photosensitive layer of the two parts of the screen. In a preferred embodiment of the invention, uniformity of illumination over the whole area of the photosensitive layer is assured by combining a field lens with the ground glass or other light diffusing medium used at the aperture plane.

As long as the above formula is followed relative to the separations of the layer screen and apertures, the present invention will be utilized, but we have found that best results are obtained from the diffraction pattern resulting from the following particular separation of screen and film (photosensitive layer). That is the screen separation S should either be between $$\frac{D^2}{6\lambda} \text{ and } \frac{D^2}{24\lambda}$$

or between $$\frac{D^2}{3\lambda} \text{ and } \frac{D^2}{2\lambda}$$

preferably at $$\frac{2D^2}{15\lambda} \text{ or } \frac{2D^2}{5\lambda}$$

where $\lambda$ is the predominate wavelength of the radiant flux exposing the film. The latter formula produces a diffraction pattern with double the number of lines per inch, and therefore assists the doubling process described herein.

The reasons for all of the above discussed limitations and the advantages of various embodiments of the invention will be fully understood from the following description when read in connection with the accompanying drawings in which.

Figure 1:
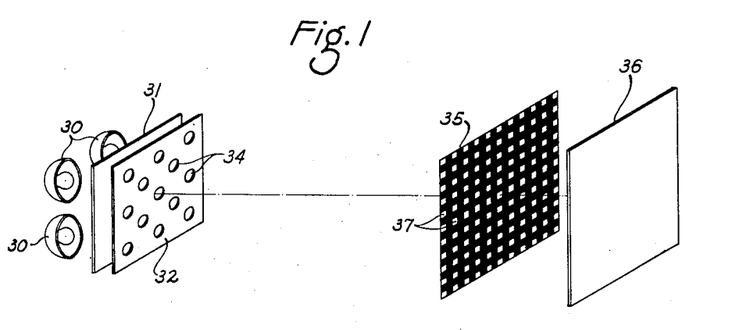
Fig. 1 is a perspective view of one embodiment of the invention.
Figure 2:
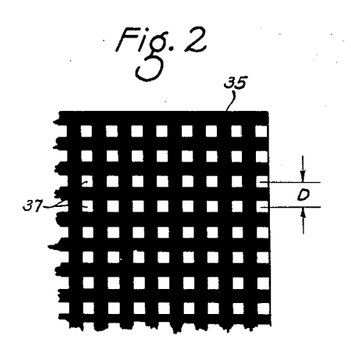
Fig. 2 is a front view of an upright two-tone screen.

In Fig. 1 light from a bank of lamps 30 through a ground glass 31 illuminates a plurality of circular apertures 34 in an opaque plate 32. Each aperture thus acts as a secondary light source. Light from the aperture passes through a two-tone halftone screen 35 to expose a photosensitive layer 36. Actually the exposure is by a diffraction pattern formed by the screen 35 but it can be considered as being primarily by light from the various apertures 34 through the various openings in the screen 35, the resulting dots being aligned with the apertures and openings. The screen 35 is intended to be illustrated as upright as shown in Fig. 2, i. e. with the rulings vertical and horizontal. This is referred to as an upright pattern. The separation of adjacent openings 37 in the screen 35 is the distance D as shown in Fig. 2. The present invention is not confined to any particular screen fineness but since it is relatively easy to make a 150 line contact screen from a 150 line two-tone screen there is little point in starting with a 75 line two-tone screen and quadrupling the number of dots although this would be perfectly feasible if desired. It is not so easy to make 300 and 400 line contact screens directly however and hence the present invention is particularly useful since such screens may be made by quadrupling from 150 and 200 line two-tone screens.

Figure 3:
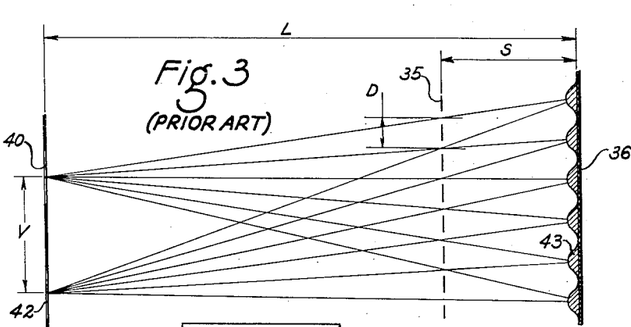
Fig. 3 illustrates diagrammatically prior systems of making contact halftone screens.

When a screen 35 is placed a distance S as shown in Fig. 3 in front of a photosensitive layer 36 and an illuminated aperture 40 is placed a distance L from the photosensitive layer, a contact halftone screen may be made by exposure from this aperture 40. Furthermore additional apertures such as 42 may be used to give additional exposure reinforcing that from the aperture 40 so as to increase the exposure of the individual dots, the exposure being illustrated graphically by the shaded areas 43. To provide this reinforcing exposure, the separation of the apertures 40 and 42, labelled V should be such that $$\frac{V}{L}=\frac{D}{S}$$

Figure 4:
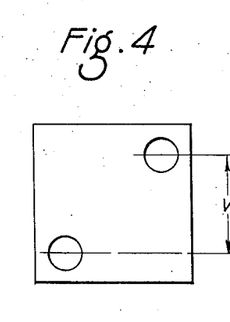
Figs. 4, 5, and 6 illustrate various forms of aperture plates which might be used in such systems.
Figure 5:
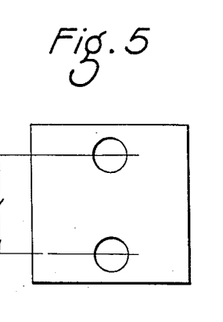
Figure 6:
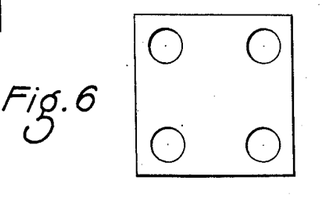

The apertures may be one above the other as shown in Fig. 5 or they may be offset as shown in Fig. 4, in which case the distance V is the vertical component of the distance between the aperture centers and also Fig. 3 would have to be considered as a projection in a vertical plane passing through the aperture 40 and the particular vertical line of openings in the screen 35 as selected. That is, Fig. 3 is considered to illustrate both the condition produced by an aperture plate such as shown in Fig. 4 and that produced by the aperture plate shown in Fig. 5. Fig. 6 shows a combination where four such apertures are used for additional reinforcement of the exposure. None of these systems double or quadruple the number of dots, they merely give the same number of dots in the contact screen as there are openings in the two-tone screen.

Figure 7:
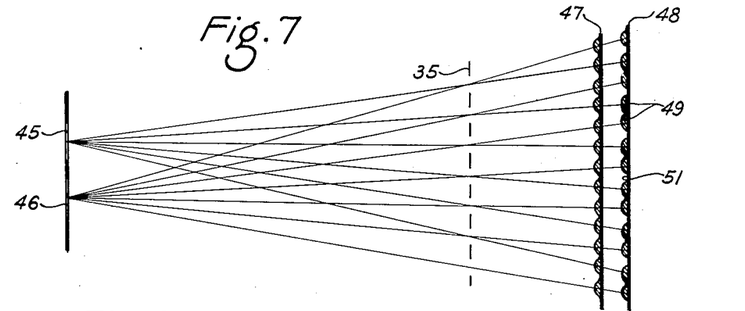
Figs. 7, 8, and 9 similarly illustrate systems which might be used for doubling or quadrupling the number of elements per unit area.
Figure 8:
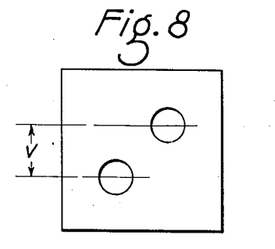
Figure 9:
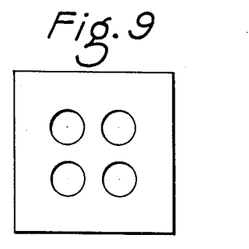

If the apertures are closer together such as apertures 45 and 46 in Fig. 7, one aperture exposes one set of dots and the other exposes another set of dots. If only two apertures were used one above the other, the dots would be closely spaced in a vertical direction and widely spaced horizontally which would be undesirable. However, by offsetting the apertures as shown in Fig. 8 it is possible to locate the new set of dots symmetrically between the old set of dots which according to the Deville patent cited above gives a checkerboard pattern of dots rather than a crossline pattern. This could be carried forward to quadrupling the number of dots merely by having four apertures as shown in Fig. 9. The use of four apertures would according to geometric optics eliminate all traces of screen pattern and Deville assumed this would be true. However, diffraction patterns, not geometric optics, are actually the controlling factors. Each aperture exposes a different set of dots thus each aperture would constitute a set of apertures as the term is defined in this specification. However, the centroid for each of such sets would be the center of each of the four apertures and hence the four centroids would not be coincident in Fig. 9 and the two centroids of Fig. 8 are not coincident. Lack of coincidence of the centroids has no effect or at least would have no effect if it were possible to insure absolute accuracy of the spacings. The photosensitive layer 47 is presumed to be accurately spaced from the screen and aperture plate, in this case according to the formula $$\frac{2V}{L}=\frac{D}{S}$$

where the terms are defined as before. However, if the film happens to be slightly out of the critical position, as indicated by 48 in Fig. 7, the dots tend to pair up making some rows close together as shown by the dots 49 and the next rows widely separated by a space 51. Such screens are quite objectionable when used in photomechanical work. As before Fig. 7 may be considered either a vertical section of Fig. 9 or a vertical projection of prior art Fig. 8.

Figure 10:
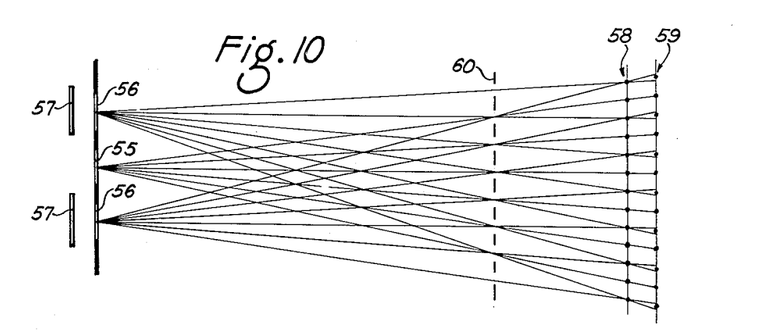
Figs. 10, 11, 12, and 13 similarly illustrate the doubling embodiment of the present invention.

Fig. 10 will be first discussed as an illustration of how the present invention may be used to correct the faults of the Fig. 7 arrangement when applied to doubling the number of lines per inch.

Figure 11:
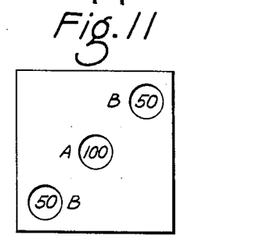
Figure 12:
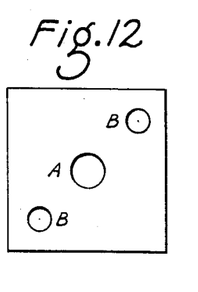
Figure 13:
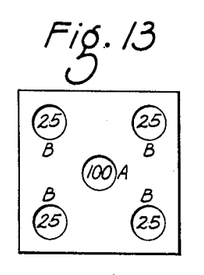
Figure 14:
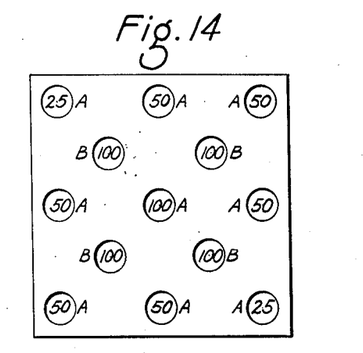
Figs. 14 and 15 show somewhat more elaborate aperture plates for use in the doubling embodiment of the invention.
Figure 15:
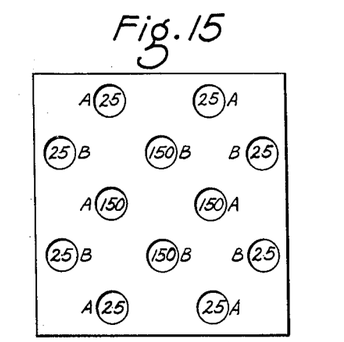
Figure 17:
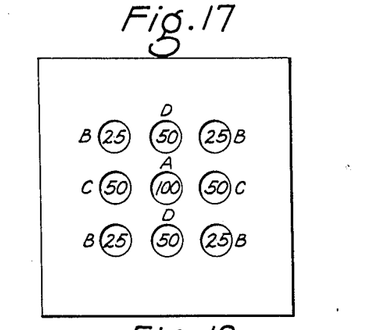
Fig. 17 which corresponds to Fig. 10 shows the simplest useful form of aperture plate for use in the quadrupling embodiment of the invention.

In Fig. 10 the aperture plate includes two sets of apertures, one the single aperture 55 which exposes one set of dots through the screen 60 and the other consisting of two apertures 56 symmetrically arranged about the aperture 55 to expose another set of dots at the film plane 58. It will be noted that if the film plane should happen to move to the position 59, it no longer causes a lack of symmetry of distribution of the dots but merely a slight increase in width of the dots exposed by the apertures 56 as compared to those exposed by the apertures 55. This slight increase in width is quite negligible whereas even the slightest error in distribution as illustrated in Fig. 7 is quite objectionable. In order to insure that each dot receives the same exposure, the total radiant flux from the two apertures 56 must equal that from the aperture 55. If the same size apertures are used, density filters 57 are provided having a density of .3 to reduce the flux through each aperture 56 to 50% of its former value. Such an arrangement of apertures is illustrated in Fig. 11 where one set of apertures is labelled A and the second set is labelled B, the figures in the circles representing the radiant flux in arbitrary units. Fig. 12 shows an alternative arrangement wherein the amount of radiant flux is controlled by employing apertures of different areas the apertures B each having half the area of the aperture A. This is quite permissible since it is the diffraction pattern that does the actual exposing of the film and hence the size of the apertures is not critical. As before, Fig. 10 must be considered a vertical projection of the system with respect to offset apertures as shown in Figs. 11 and 12, whereas it may be considered as a true vertical section relative to apertures such as shown in Fig. 17 discussed later. Fig. 13 shows an alternative arrangement of apertures, one set B consisting of four apertures symmetrically arranged about the central aperture A and each having only 25% of the total flux. In all three cases the centroid for the set B falls in the center of the aperture A and hence coincides with the centroid for the aperture A. Figs. 14 and 15 illustrate somewhat more elaborate arrangements meeting the requirements that the centroids coincide and the total radiant flux through the two sets are equal. In Fig. 15 it will be noted that the centroid does not fall in any one of the apertures but rather in the center of the pattern.

Figure 16:
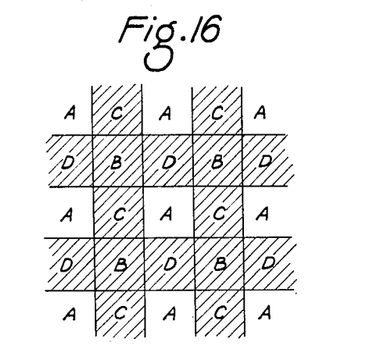
Fig. 16 is a diagram for use in visualizing the location of the sets of dots in the contact screen according to the present invention.

Fig. 16 may be considered as representing areas on the photosensitive film, the areas A being directly behind the openings in the two-tone screen with respect to some one aperture, for example aperture 55 of Fig. 10. In order to have a symmetrical and uniform contact screen with twice as many dots as the two-tone screen, it is necessary to arrange the exposing apertures so that the areas B in Fig. 16 are exposed. The combination of dots A and B results in a screen with a pattern effectively at 45° to the two-tone screen. In order to quadruple the number of dots it becomes necessary to expose areas C which are horizontally between the areas A and areas D which are vertically between the areas A and thus a total of four sets of apertures are required.

Figure 18:
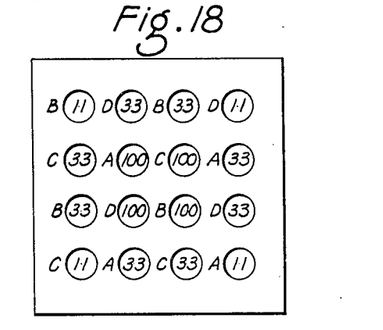
Figs. 18 to 22 inclusive show other aperture plates for use in the quadrupling embodiment of the invention.
Figure 19:
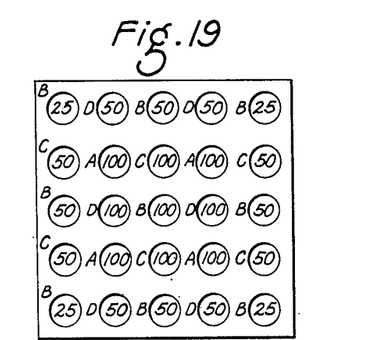

The simplest system for doing this is illustrated in Fig. 17 wherein the four sets of apertures are marked A, B, C, and D to correspond to the dots which they are to expose. It will be noted that the centroids of the four sets of apertures in Fig. 17 all coincide at the middle of the single aperture A. Furthermore the radiant flux through each set of apertures totals 100. More elaborate arrangements of apertures are shown in Figs. 18 and 19 and simple computation will show that the radiant flux for each set of apertures in Fig. 18 equals 177 units and in Fig. 19 equals 400 units. The centroids of each set are at the center of the pattern in each case.

Figure 20:
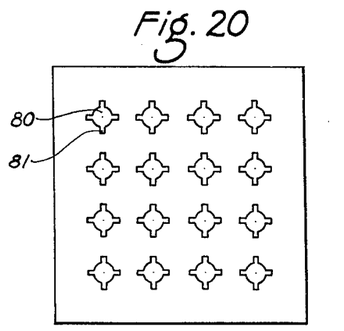
Figure 21:
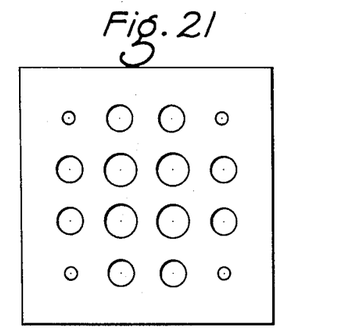

Although for illustrative purposes the apertures are shown relatively large, in actual practice the dimensions are somewhat reduced as shown in Fig. 20 which corresponds to Fig. 18. In Fig. 20 each aperture consists of a circular area 80 about .1 inch in diameter provided with four ears 81 each about .05 inch long and .01 inch wide so that the maximum diameter of each aperture is about .2 inch. In this specific example which is intended for use with a camera extension L equal to 96 inches, the distance V between adjacent apertures is .8 inch. These figures are given merely to indicate relative sizes used in actual practice but in any particular instance, the above discussed formulas must be followed. Instead of using filters to control the radiant flux through the various apertures, the areas of the apertures may be different as shown in Fig. 21. In this connection it is generally better not to reduce the over all length of the ears, but merely to reduce the diameter of the inner circle, the area of the ears being taken into account in determining the radiant flux of course. That is, if ears such as shown in Fig. 20 were included in the variable area diaphragms of Fig. 21 the maximum diameter of the aperture measured to include the ears would be .2 inch in every case but the inner circle of each aperture would be .1 inch for the four inner apertures and proportionately less for the outer rows of apertures.

Figure 22:
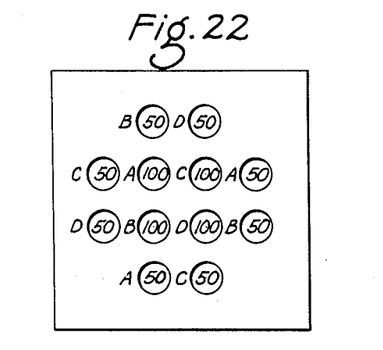

Fig. 22 is a highly preferred form of the invention since the total brightness from all twelve apertures is eight times that from one of the central apertures whereas Fig. 18 for example gives only seven times this single aperture brightness and employs sixteen apertures instead of twelve to get it. Fig. 17 has a total brightness only four times that of a single aperture. The total brightness of course controls the total exposure time required, the exposure being made by a diffraction pattern to which all apertures contribute. The apertures in Fig. 22 are located at the twelve corners of a Geneva cross as discussed previously.

Figure 23:
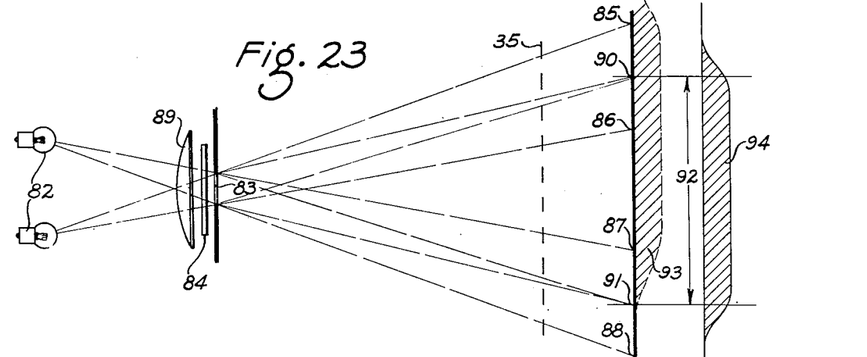
Fig. 23 diagrammatically illustrates a preferred feature of the invention.

Fig. 23 illustrates the effect of a rather novel combination of optical elements namely the combination of a ground glass and a field lens. In the manufacture of contact screens it is necessary to have uniform illumination over a considerable area of the film, for example the film may be 24, 26, or even 48 inches in diameter. The uniformity should be held within ±2% for best results whereas even a perfect diffusing glass, i. e. one following the cosine law, would send several per cent greater intensity to the center of a 24 inch square than to the corners thereof if the ground glass is at a distance of 96 inches from the square. With ordinary ground glass the diffusivity is somewhat directional and hence this variation is aggravated. Another factor in designing the actual optical layout which is quite important in the manufacture of contact screens is the fact that brightness must be uniform in the plane of the apertures (except of course for the above discussed control of radiant flux). Fig. 23 illustrates an ideal way of obtaining uniform illumination both in the plane of the aperture and in the plane of the emulsion. Only one aperture is illustrated, but the edges thereof may be considered as corresponding to the extreme apertures in one of the other figures. Four lamps two of which appear at 82 are located at the corners of a square and send light through a field lens 89 and a ground glass 84 to illuminate an aperture 83 uniformly. Without the field lens 84, this arrangement has been found to give fairly uniform illumination at the film plane but not quite uniform enough. The area of the film plane between the points 85 and 87 receives approximately uniform illumination as shown by the shaded area 93 from the upper half of the aperture 83. At the same time the part of the film plane between the points 86 and 88 receives uniform illumination from the lower half of the aperture 83. This means that the area between the points 86 and 87 is uniformly illuminated from all points of the aperture but that there is a falling off in illumination as one proceeds towards the points 85 and 88. This is overcome according to a special feature of the invention by the inclusion of a field lens 89. It should be noted that it is not customary to combine field lenses with diffusing layers. The field lens 89 acts to focus the light sources at the film plane, not actually of course because of the ground glass 84. However, light no longer goes in useful quantities out as far as the point 85 or out as far as the point 88. Both the upper and the lower edge of the aperture 83 now illuminate uniformly the area between the points 90 and 91. The distribution of illumination is represented graphically by the shaded area 94 drawn to one side of the figure. Obviously, the area 92 which is now uniformly illuminated is much greater than the area between the points 86 and 87 which was the area illuminated uniformly in the absence of field lens 89.

Figure 24:
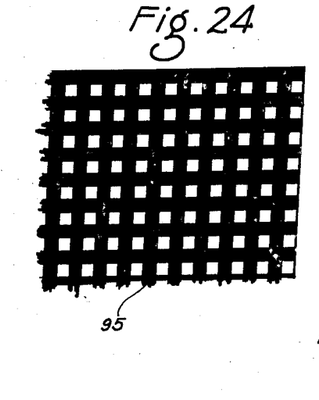
Fig. 24 is a front view of a two-tone screen in which the rulings are not quite at right angles.
Figure 25:
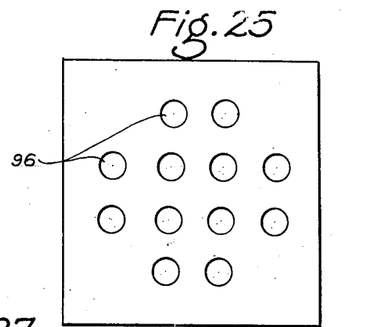
Fig. 25 illustrates a modification of Fig. 22 to correct for the error introduced by the screen illustrated in Fig. 24.

As shown in Fig. 24 it sometimes happens that ruled screens have their rulings 95 not quite at right angles. The error is greatly exaggerated in Fig. 24. The present invention requires alignment of the apertures with the screen openings and hence, as shown in Fig. 25 the apertures 96 should be arranged in a slightly oblique pattern corresponding to the obliquity of the screen. Any resulting obliquity in the contact screen is not serious, of course, the adjustment of the aperture arrangement being merely to insure proper operation of the present invention. The definition of V given previously should be interpreted to include these slight modifications in which the reference pattern is not quite rectilinear.

Figure 26:
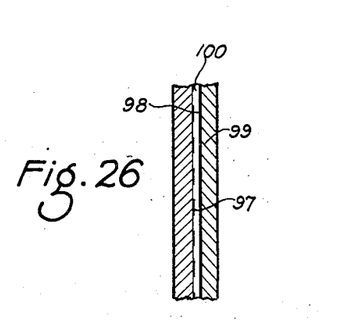
Fig. 26 is a vertical section of a two-tone screen with rulings on opposite sides of a transparent plate.
Figure 27:
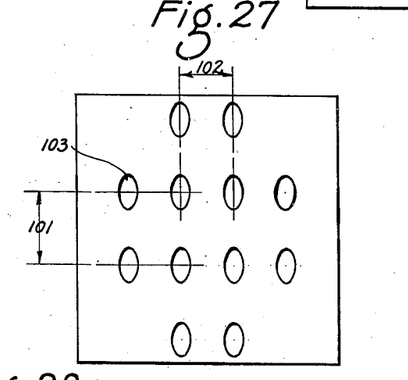
Fig. 27 is a modification of Fig. 22 to correct for the error introduced by the screen shown in Fig. 26.

Master crossline screens are usually ruled as shown in Fig. 26 on two glass plates 99 with the horizontal rulings 97 on one plate and the vertical rulings 98 on the other. The plates are cemented together and the thickness of the cement 100 causes the two sets of rulings to be at different distances from the film. It is not possible to have simultaneously two different distances between the film and the aperture plate but it is possible to have the apertures arranged with the vertical separation 101 of their centers different from the horizontal separation 102 as shown in Fig. 27. This would allow the formula $$\frac{2V}{L} = \frac{D}{S}$$

to be simultaneously satisfied for both values of S. In Fig. 27 the vertical V (101) is greater than the horizontal V (102) which means that the distance S for the vertical separation D (i. e. for the horizontal rulings) is less than the separation S for the horizontal spacing D. The individual apertures 103 should theoretically be elliptical (and even in Fig. 25 the apertures 96 might be made elliptical with their major axes oblique) but this would be a third order refinement and would have no practical effect.

Figure 28:
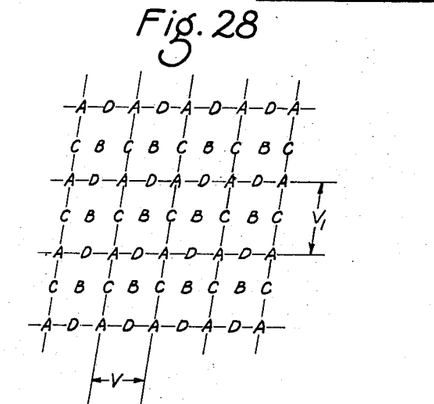
Fig. 28 illustrates the basic pattern for an aperture plate.

Fig. 28 is included merely to illustrate the basic pattern for arrangement of apertures on the aperture plate. The vertical separation $V_1$ of the primary set of apertures A follows the simple rule for making 1 to 1 screens i. e.

$$\frac{V_1}{L} = \frac{D}{S}$$

all with respect to vertically separated screen openings. Similarly the horizontal separation of the primary set of apertures A follows the rule $$\frac{V_2}{L} = \frac{D}{S}$$

$V_1$ is equal to $V_2$ when the S values are the same. The obliquity of the basic pattern and the possible location of apertures sets B, C, and D are indicated in Fig. 28. Of course apertures need not be placed at all of the locations assigned to any one of the sets. The more apertures that are provided, the greater is the exposure, in general, but note the efficiency of Fig. 22. The location and intensity of the apertures must follow the rule that the radiant flux centroids must coincide and the total radiant flux of the various sets of apertures must be equal.

A specific example is the making of a 300 line contact screen from 150 line master screen employing a screen distance S equal to 0.4 inch, a light source consisting of four lamps at the corners of a four-inch square eight inches from the apertures with a Corning No. 584 filter two millimeters thick to restrict the light from the four (100 watt "AH-4" General Electric mercury vapor) lamps to a useful part of the spectrum and sixteen apertures arranged as in Figs. 18 and 20. The distance L between the apertures and the film is 96 inches; the exposure is about 3½ minutes on a fine grain film developed to a fairly high gamma to an average density of about .8. The contact screen may be a colored one in accordance with U. S. 2,311,071 Murray. A field lens is included as discussed in connection with Fig. 23. It is noted that in addition to the cancelling out of errors by means of the present invention requiring superimposed centroids, there are two compensating effects with respect to the dot contrast. The dot contrast will tend to increase owing to the smaller size of images of the aperture as the screen distance is reduced to less than the calculated value, but at the same time the contrast will tend to decrease owing to the fact that the dots no longer coincide. These two effects cancel one another over an appreciable range of screen distances and the latitude is greater when a large number of exposing apertures are used. Furthermore actual considerations with respect to the range of adjustment of the screen distance S shows that the range extends more toward smaller distances than it does toward greater distances from the exact calculated value according to the formula $$\frac{2V}{L} = \frac{D}{S}$$

In fact the middle of the useful range is about 95% of the calculated distance and in practice it is better to aim toward an S value equal to 95% of the value calculated from the above formula although the above formula is quite correct. Because of this latitude, we state merely that the separations should be approximately according to the formula. Incidentally 5% change in screen distance has little effect on the diffraction pattern and hence in making adjustments of this sort, it is quite satisfactory to actually change the screen distance although theory would require that the screen distance be chosen for the best diffraction pattern and then the camera extension L be chosen according to the formula or the 5% modification of the formula desired.

The invention is not limited to the specific examples discussed but is of the scope of the appended claims.

We claim:

1. The method of manufacturing a contact halftone screen with a pattern of dots having the number of dots per inch an integral multiple of the corresponding number in a two-tone screen from which the contact screen is made, which method comprises exposing a photosensitive layer through the two-tone screen parallel to and spaced from the layer, to a number of distinct sets of illuminated apertures which number is equal to said integral multiple, a set of apertures being one or more apertures all aligned with the screen to expose primarily one and only one set of dots corresponding exactly to the number per inch and location of the screen openings the different sets of apertures primarily exposing different sets of dots and all of the sets of dots making up a uniformly distributed dot pattern characterized by not more than one of said sets of apertures consisting of only one aperture, the radiant flux from each set of apertures substantially equalling that from each other set and the radiant flux centroid for each set of apertures substantially coinciding with that for each other set and processing the layer.

2. The method of manufacturing a contact two-tone screen with a pattern of dots having the number of dots per inch an integral multiple of the corresponding number in a two-tone screen from which the contact screen is made, which comprises placing a photosensitive layer parallel to and at a distance behind the two-tone screen, locating a number of distinct sets of illuminated apertures equal to said integral multiple, in a plane parallel to and at a distance in front of the screen with each set of apertures aligned with the screen to expose primarily a different set of dots corresponding to the screen openings, all of the sets of dots making up a uniformly distributed dot pattern, exposing the layer through the screen by sending substantially equal amounts of radiant flux through each set of apertures with the radiant flux centroids of the sets of apertures substantially coincident and processing the layer.

3. The method according to claim 1 in which the separation of the layer, the screen and the plane of apertures are approximately according to the formula $$\frac{2V}{L} = \frac{D}{S}$$

where L is the distance of the aperture plane from the layer, S is the distance of the two-tone screen from the layer, D is the distance between the centers of adjacent openings in the two-tone screen and V is the component, measured parallel to D, of the distance between the centers of adjacent apertures.

4. The method according to claim 2 in which the separation of the layer, the screen and the plane of apertures are approximately according to the formula $$\frac{2V}{L} = \frac{D}{S}$$

where L is the distance of the aperture plane from the layer, S is the distance of the two-tone screen from the layer, D is the distance between the centers of adjacent openings in the two-tone screen and V is the component, measured parallel to D, of the distance between the centers of adjacent apertures.

5. The method according to claim 1 in which there are two sets of apertures distributed in a pattern at 45° to the two-tone screen pattern.

6. The method according to claim 2 in which there are two sets of apertures distributed in a pattern at 45° to the two-tone screen pattern.

7. The method according to claim 1 in which there are four sets of apertures distributed in a pattern parallel to the two-tone screen pattern.

8. The method according to claim 2 in which there are four sets of apertures distributed in a pattern parallel to the two-tone screen pattern.

9. The method according to claim 1 in which each individual aperture has four ears extending along the lines joining the centers of adjacent apertures.

10. The method according to claim 2 in which each individual aperture has four ears extending along the lines joining the centers of adjacent apertures.

11. The method according to claim 1 in which twelve apertures are located with their centers at the corners of a Geneva cross oriented parallel to the two-tone screen pattern, and in which twice as much radiant flux is sent through each one of the four inner corner apertures as through each one of the eight outer apertures.

12. The method according to claim 2 in which twelve apertures are located with their centers at the corners of a Geneva cross oriented parallel to the two-tone screen pattern, and in which twice as much radiant flux is sent through each one of the four inner corner apertures as through each one of the eight outer apertures.

13. The method according to claim 1 in which a field lens and a translucent layer are included at the aperture plane to insure uniform distribution of flux from the apertures toward the photosensitive layer.

14. The method according to claim 2 in which a field lens and a translucent layer are included at the aperture plane to insure uniform distribution of flux from the apertures toward the photosensitive layer.

15. The method according to claim 1 in which the radiant flux is predominantly of wavelength λ and in which the distance between the two-tone screen and the photosensitive layer is S where S is between $$\frac{D^2}{6\lambda} \text{ and } \frac{D^2}{24\lambda}$$

and D is the distance between the centers of adjacent openings of the two-tone screen.

16. The method according to claim 2 in which the radiant flux is predominantly of wavelength λ and in which the distance between the two-tone screen and the photosensitive layer is S where S is between $$\frac{D^2}{6\lambda} \text{ and } \frac{D^2}{24\lambda}$$

and D is the distance between the centers of adjacent openings of the two-tone screen.

17. The method according to claim 1 in which the radiant flux is predominantly of wavelength λ and in which the distance between the two-tone screen and the photosensitive layer is S where S is between $$\frac{D^2}{2\lambda} \text{ and } \frac{D^2}{3\lambda}$$

and D is the distance between the centers of adjacent openings of the two-tone screen.

18. The method according to claim 2 in which the radiant flux is predominantly of wavelength λ and in which the distance between the two-tone screen and the photosensitive layer is S where S is between $$\frac{D^2}{2\lambda} \text{ and } \frac{D^2}{3\lambda}$$

and D is the distance between the centers of adjacent openings of the two-tone screen.

JOHN A. C. YULE.
FREDERICK B. JOHNSTON.

REFERENCES CITED

The following references are of record in the file of this patent:

UNITED STATES PATENTS

| Number | Name | Date |
|---|---|---|
| 551,266 | Deville | Dec. 10, 1895 |

FOREIGN PATENTS

| Number | Country | Date |
|---|---|---|
| 6,571 | Great Britain | 1891 |
| 7,431 | Great Britain | 1899 |
| 6,296 | Great Britain | 1905 |
| 452,648 | Great Britain | Aug. 25, 1936 |
| 680,990 | Germany | Sept. 13, 1939 |

OTHER REFERENCES

Mertle, "The American Photo-Engraver," vol. 21, No. 10, September 1929, pp. 937 to 948. (Copy in 95–81.)